United States Patent
Hayashi et al.

(10) Patent No.: US 11,055,863 B2
(45) Date of Patent: Jul. 6, 2021

(54) THREE-DIMENSIONAL SHAPE MEASUREMENT DEVICE, THREE-DIMENSIONAL SHAPE MEASUREMENT METHOD, AND PROGRAM

(71) Applicant: OMRON Corporation, Kyoto (JP)

(72) Inventors: Kennosuke Hayashi, Tokyo (JP); Yasuhiro Ohnishi, Kyotanabe (JP); Masaki Suwa, Kyoto (JP)

(73) Assignee: OMRON Corporation, Kyoto (JP)

( * ) Notice: Subject to any disclaimer, the term of this patent is extended or adjusted under 35 U.S.C. 154(b) by 71 days.

(21) Appl. No.: 16/484,134

(22) PCT Filed: Nov. 28, 2017

(86) PCT No.: PCT/JP2017/042490
§ 371 (c)(1),
(2) Date: Aug. 7, 2019

(87) PCT Pub. No.: WO2018/163530
PCT Pub. Date: Sep. 13, 2018

(65) Prior Publication Data
US 2020/0020119 A1    Jan. 16, 2020

(30) Foreign Application Priority Data
Mar. 7, 2017    (JP) .............................. JP2017-043115

(51) Int. Cl.
*G06T 7/514*   (2017.01)
*G01B 9/02*    (2006.01)
(Continued)

(52) U.S. Cl.
CPC ............ *G06T 7/514* (2017.01); *G01B 9/0201* (2013.01); *G01B 11/2527* (2013.01); *G01C 11/025* (2013.01)

(58) Field of Classification Search
CPC .......... G06T 7/514; G06T 7/50; G06T 7/521; G01B 9/0201; G01B 11/2527; G01B 11/25; G01C 11/025
See application file for complete search history.

(56) References Cited

U.S. PATENT DOCUMENTS

2015/0109419 A1*  4/2015  Vollrath ................... G01C 3/08
                                                              348/47
2015/0362444 A1* 12/2015  Nagai .............. G01N 23/20075
                                                              378/36
2017/0329012 A1  11/2017  Buttgen et al.

FOREIGN PATENT DOCUMENTS

CN    103398675 A    11/2013
CN    105761243 A     7/2016
(Continued)

OTHER PUBLICATIONS

"List of Trigonometric Identities", 2016, pp. 11-12 (Year: 2016).*
(Continued)

*Primary Examiner* — Sumati Lefkowitz
*Assistant Examiner* — Dalen O Goodson
(74) *Attorney, Agent, or Firm* — Metrolex IP Law Group, PLLC

(57) ABSTRACT

A control device assumes that observation light observed by an imaging device is composite light of primary reflection light and secondary reflection light. The control device acquires three or more samples of a brightness amplitude value of the observation light, calculates a phase error caused by the secondary reflection light using these samples, calculates a corrected phase value by correcting a phase value of the observation light using the phase error, and calculates a three-dimensional position of the measurement point on the measurement object based on the corrected phase value.

11 Claims, 6 Drawing Sheets

(51) Int. Cl.
  *G01B 11/25* (2006.01)
  *G01C 11/02* (2006.01)

(56) References Cited

FOREIGN PATENT DOCUMENTS

| | | | | | |
|---|---|---|---|---|---|
| CN | 105783784 | A | | 7/2016 | |
| JP | 2005-062063 | A | | 3/2005 | |
| JP | 2006-275529 | A | | 10/2006 | |
| JP | 2008-309551 | A | | 12/2008 | |
| JP | 2009-019941 | A | | 1/2009 | |
| JP | 2011-021970 | A | | 2/2011 | |
| JP | 2014-115109 | | * | 6/2014 | ............ G01B 11/25 |
| JP | 2015-021862 | A | | 2/2015 | |
| JP | 2016-130663 | A | | 7/2016 | |
| KR | 10-0637363 | | * | 10/2006 | ............ G03B 35/24 |
| TW | 200806950 | | * | 2/2008 | ............ G01B 11/00 |
| TW | I296324 | | * | 5/2008 | ............ G01B 11/25 |
| WO | 2016/076796 | A1 | | 5/2016 | |

OTHER PUBLICATIONS

Office Action dated Jul. 28, 2020 in a counterpart Chinese patent application.
Mohit Gupta et al., "Micro Phase Shifting", Computer Vision and Pattern Recognition (CVPR), 2012 IEEE Conference; concise explanation of relevance provided in the specification.
English translation of the International Search Report ("ISR") of PCT/JP2017/042490 dated Jan. 9, 2018.
English translation of the Written Opinion("WO") of PCT/JP2017/042490 dated Jan. 9, 2018.
Yongchang Wang et al., "Robust Active Stereo Vision Using Kullback-Leibler Divergence", IEEE Transactions on Pattern Analysis and Machine Intelligence, Mar. 1, 2012, pp. 548-563, vol. 34, No. 3, IEEE Computer Society, USA; Relevance is indicated in the EESR dated Jan. 12, 2021.
Zhongwei Li et al., "Gamma-distorted fringe image modeling and accurate gamma correction for fast phase measuring profilometry", Optics Letters, Jan. 15, 2011, pp. 154-156, vol. 36, No. 2, Optical Society of America, US; Relevance is indicated in the EESR dated Jan. 12, 2021.
Xiaochang Xu et al., "Error Reduction for the High-Contrast Regions in Phase Measuring Profilometry", 2013 IEEE China Summit and International Conference on Signal and Information Processing, Jul. 6, 2013, pp. 72-76, IEEE [retrieved on Oct. 8, 2013]; Relevance is indicated in the EESR dated Jan. 12, 2021.
Refael Whyte et al., "Resolving multiple propagation paths in time of flight range cameras using direct and global separation methods", Optical Engineering, Nov. 1, 2015, pp. 113109-1-13109-9, vol. 54, No. 11, Society of Photo-Optical Instrumentation Engineers, Bellingham, US [retrieved on Nov. 24, 2015]; Relevance is indicated in the EESR dated Jan. 12, 2021.
Extended European search report (EESR) dated Jan. 12, 2021 in a counterpart European patent application.

* cited by examiner

THREE-DIMENSIONAL SHAPE MEASUREMENT DEVICE, THREE-DIMENSIONAL SHAPE MEASUREMENT METHOD, AND PROGRAM

TECHNICAL FIELD

The present invention relates to a technique to project a cyclic pattern to a measurement object, and to measure a three-dimensional shape of the measurement object using an observed image.

BACKGROUND ART

A phase shifting method is known as a technique to measure a three-dimensional shape of an object using an image. The phase shift method is a method of projecting a cyclic pattern to a measurement object using a projector, and analyzing the distortion (phase shift) of the projection pattern that is generated depending on the irregularities on the object surface, so as to restore the three-dimensional shape of the object surface. As an improved method of the phase shift method, a method called micro phase shifting (MPS) is also known (see NPL 1).

In these methods, reflected light from another object that exists around the measurement object may drop the measurement accuracy in some cases. This phenomenon will be described with reference to FIG. 6. FIG. 6 depicts a measurement system using an imaging device 200 and a projector 201. Light 201L having a predetermined pattern is projected from the projector 201 to a measurement object 202, and the projection pattern acquired on the surface of the measurement object 202 is captured by the imaging device 200. At this time, the distortion of the projection pattern generated by the surface irregularities of the measurement object 202 appears as a brightness change of the image. Therefore based on this brightness change of the image, the positional relationship among the projector 201, a point on the surface of the measurement object 202 and the imaging device 200 is specified, whereby the height (three-dimensional position) of the surface of the measurement object 202 can be calculated using the triangulation.

However, as shown in FIG. 6, if an object having high specularity (e.g. metal object) 203 exists near the measurement object 202, the light projected from the projector 201 is reflected on the side face of the object 203, and this reflected light 203L may irradiate on the surface of the measurement object 202. If this occurs, the observation light observed by the imaging device 200 contains not only reflected light 201R (primary reflection light) of the light 201L of the projector 201, but also reflected light 203R (secondary reflection light or multiple reflection light) of the light 203L from the object 203. This secondary reflection light 203R becomes noise, and is superimposed on the projection pattern on the surface of the measurement object 202, hence an analysis of this projection pattern (that is, calculation of the phase value of the observation light) is affected thereby, and a measurement error is generated. This phenomenon is called "secondary reflection" or "multiple reflection".

As a method of reducing the influence of the multiple reflection, PTL 1 proposes a method of specifying a portion which causes the multiple reflection and imaging a projection pattern projected on this portion in a dimmed or extinguished light state. However if the light is dimmed or extinguished when the projection pattern is imaged, as in this method, a portion where the three-dimensional shape cannot be measured (that is, a blind spot) may be generated. Further, this method cannot effectively suppress multiple reflection unless the portion which causes the multiple reflection (portion of the projection pattern for which light is dimmed or extinguished) is accurately specified in advance, hence implementing this method in an actual apparatus is difficult.

CITATION LIST

Patent Literature

PTL 1: Japanese Patent Application Publication No. 2008-309551

Non Patent Literature

NPL 1: Gupta, Mohit, and Shree K. Nayar. "Micro phase shifting." Computer Vision and Pattern Recognition (CVPR), 2012 IEEE Conference on. IEEE, 2012.

SUMMARY OF INVENTION

Technical Problem

With the foregoing in view, it is an object of the present invention to provide a technique to reduce the influence of multiple reflection and improve measurement accuracy, in a method of measuring a three-dimensional shape based on a phase of a pattern projected to the measurement object.

Solution to Problem

To achieve the above object, the present invention uses a configuration to estimate a phase error caused by multiple reflection based on samples of the brightness amplitude values of the measurement light at a plurality of points, and correct the phase value of the observation light using this phase error.

In concrete terms, a three-dimensional shape measurement device according to the present invention includes: a projection device which projects a pattern having cyclicity in a time direction and a space direction to a measurement object; an imaging device which captures an image of the measurement object; and a control device which measures a three-dimensional shape of the measurement object using a plurality of observation images captured by the imaging device while changing a phase of a pattern projected from the projection device. The control device assumes that observation light observed by the imaging device is composite light of primary reflection light and secondary reflection light, the primary reflection light being light which is projected from the projection device, is reflected at a measurement point on the measurement object and enters the imaging device, the secondary reflection light being light which is projected from the projection device, is reflected on another reflection surface, is reflected at the measurement point on the measurement object and enters the imaging device; acquires three or more samples of a brightness amplitude value of the observation light based on the plurality of observation images; calculates a phase error caused by the secondary reflection light by solving the following expression using three or more samples; calculates a phase value of the observation light based on the plurality of observation images; calculates a corrected phase value by correcting the phase value of the observation light using the phase error; and calculates a three-dimensional position of the measurement point on the measurement object based on the corrected phase value.

[Math. 1]

$$\Delta\theta = \arctan\left(\frac{b\sin(\alpha)}{a + b\cos(\alpha)}\right)$$
$$c = \sqrt{a^2 + b^2 + 2ab\cos(\alpha)}$$

$\Delta\theta$: phase error caused by secondary reflection light
a: brightness amplitude value of primary reflection light
b: brightness amplitude value of secondary reflection light
c: brightness amplitude value of observation light
$\alpha$: phase difference between primary reflection light and secondary reflection light According to this configuration, a three-dimensional shape is calculated based on the phase value after correcting the phase error caused by the secondary reflection light, hence high precision three-dimensional shape measurement, with less influence of multiple reflection, can be implemented. Further, the method of the present invention does not interrupt the measurement of the three-dimensional shape, unlike conventional methods, and can be applied regardless whether multiple reflection is actually generated in the portion or not, therefore this method can be easily implemented in an actual apparatus.

It is preferable that three or more samples are samples conditions of which are different in at least one of: the position of the pixel on the observation image; and the spatial frequency of the pattern.

For example, it is preferable that the three or more samples are the brightness amplitude values that are observed for three or more pixels on the observation image using one type of frequency pattern, and the three or more pixels are pixels such that phases of the pattern at positions of the pixels are different from each other. This is because only one type of pattern is required, which means that a number of times of capturing the observation image can be less.

It is preferable that the three or more pixels are selected for a local region on the observation image. This is because pixels in a local region (micro region that can be approximated as a plane) can be regarded as pixels under the same conditions (i.e., reflectance of the measurement object surface).

It is preferable that the three or more pixels are pixels which line up in a direction parallel with an epi-polar line on the observation image. This is because selecting samples like this makes it possible to accurately calculate the phase error using a minimum number of samples.

It is preferable that the three or more samples are brightness amplitude values observed for one pixel on the observation image using three or more types of frequency patterns. In the case of this method, the samples for the sample pixel (same measurement point) are used, hence phase error can be estimated more accurately.

It is preferable that the control device stores reference information that defines a relationship of a first index on the brightness amplitude value, a second index on the spatial frequency of the pattern to be projected, and a third index on the phase difference between the primary reflection light and the secondary reflection light, and determines the phase difference between the primary reflection light and the secondary reflection light based on the three or more samples, the spatial frequency of the pattern projected when each sample was observed, and the reference information. According to this method, the value of the phase difference between the primary reflection light and the secondary reflection light can be calculated simply and accurately from the values of the three or more samples.

It is preferable that the control device calculates the three-dimensional position of the measurement point on the measurement object by the phase shift method or micro phase shifting (MPS) based on the corrected phase value. It is preferable that the another reflection surface is a specular reflection surface.

The present invention may be regarded as a three-dimensional shape measurement device or an image processing device that includes at least a part of the above mentioned configurations or functions. The present invention may also be regarded as an inspection apparatus, a three-dimensional scanner or an object recognition apparatus that includes this three-dimensional shape measurement device. Further, the present invention may be regarded as a three-dimensional shape measurement method, an image processing method, an inspection method, or an object recognition method that includes at least a part of the above mentioned processing, or a program that causes a computer to execute these methods, or a non-transitory computer readable recording medium that records this program. Each of the above mentioned configurations and processing may be combined with each other to constitute the present invention, as long as no technical inconsistency is generated.

Advantageous Effects of Invention

According to the present invention, the influence of multiple reflection can be reduced and the measurement accuracy can be improved in a method of measuring a three-dimensional shape based on a phase of a pattern projected to the measurement object.

DESCRIPTION OF EMBODIMENTS

The present invention relates to a three-dimensional shape measurement technique to measure a three-dimensional shape of a measurement object based on the change of the phase of a pattern projected to the measurement object, and more particularly to a method of reducing the influence of multiple reflection caused by a reflection surface that exists around the measurement object, and improving the measurement accuracy. The present invention can be suitably applied to a three-dimensional shape measurement using a phase shift method or micro phase shifting (MPS), which is an improved phase shift method. The three-dimensional shape measurement according to the present, invention can be applied to various apparatuses, such as a three-dimensional scanner which measures the surface shape of an object, an inspection apparatus which inspects an object based on a measured three-dimensional shape, and an apparatus which performs object recognition or individual identification based on a measured three-dimensional shape. For example, in the case of a visual inspection apparatus for a surface mount substrate, multiple reflection caused by the metal components on the substrate may drop inspection accuracy, therefore the three-dimensional shape measurement according to the present invention can be especially useful if applied.

An example of a preferred embodiment of the present invention will be described with reference to the drawings. However the configurations and operations of the apparatuses described in the following embodiment are examples, and are not intended to limit the scope of the invention to only these configurations and operations.

(Configuration of Three-Dimensional Shape Measurement Device)

Figure 1:
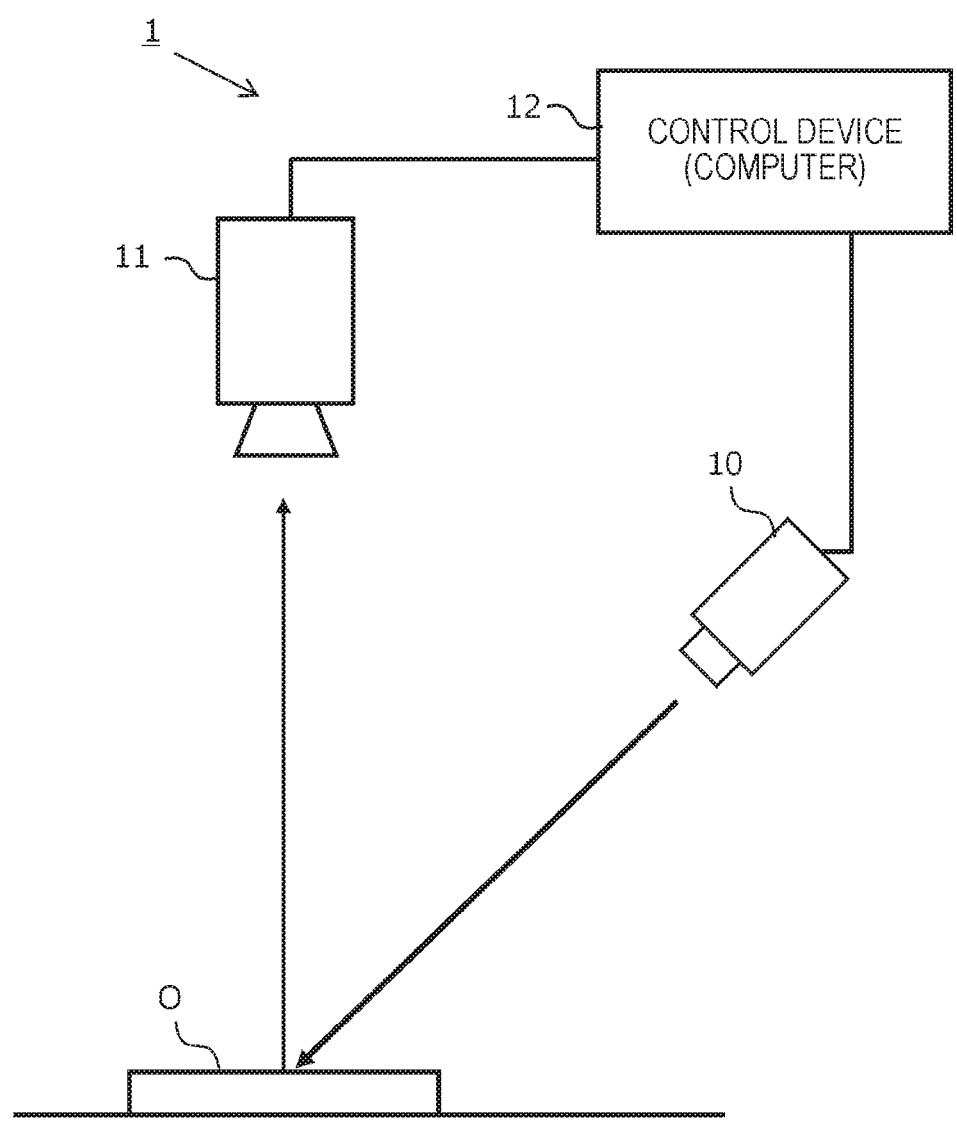
FIG. 1 is a schematic diagram depicting a hardware configuration of a three-dimensional shape measurement device.

A general configuration of a three-dimensional shape measurement device according to this embodiment will be described with reference to FIG. 1. FIG. 1 is a schematic diagram depicting a hardware configuration of the three-dimensional shape measurement device. The three-dimensional shape measurement device 1 is an apparatus to measure a three-dimensional shape of a measurement object O, and is constituted of a projection device (projector) 10, an imaging device (camera) 11, and a control device (computer) 12.

The projection device 10 is a projection unit that projects a pattern which has a cyclicity in the time direction and the space direction to the measurement object O. A number of projection devices 10 may be one, but a plurality of projection devices 10 may be disposed so that the pattern can be projected to the projection device 10 in a plurality of directions. For the projection device 10, a digital light processing (DLP) projector, using a digital mirror device, can be preferably used. This is because a DLP projector can easily change the projection patterns.

The imaging device 11 is a unit that captures an image of a measurement object O to which a pattern is projected, and outputs a digital image. The imaging device 11 is constituted of an optical system and an image sensor, for example. When the three-dimensional shape measurement is performed, the imaging device 11 captures a plurality of images while changing the phase of the pattern projected from the projection device 10 (also while changing the frequency of the pattern in the case of performing the phase unwrapping). An image of the measurement object O that is captured by the imaging device 11 is called an "observation image".

The control device 12 is a unit that has such functions as: controlling the projection device 10 and the imaging device 11; processing an image captured by the imaging device 11; and measuring a three-dimensional shape. The control device 12 may be a computer which includes a CPU (processor), a memory, a non-volatile storage device (e.g. hard disk, flash memory), an input device (e.g. keyboard, mouse, touch panel), and a display device (e.g. liquid crystal display). Each function of the control device 12, which be described later, can be implemented by loading a program stored in the non-volatile storage device, and the CPU executing this program. However all or a part of the functions of the control device 12 may be performed by an ASIC, an FPGA or dedicated hardware. Further, the functions of the control device 12 may be implemented by the collaboration of a plurality of computers using techniques of distributed computing and dedicated hardware.

Figure 2:
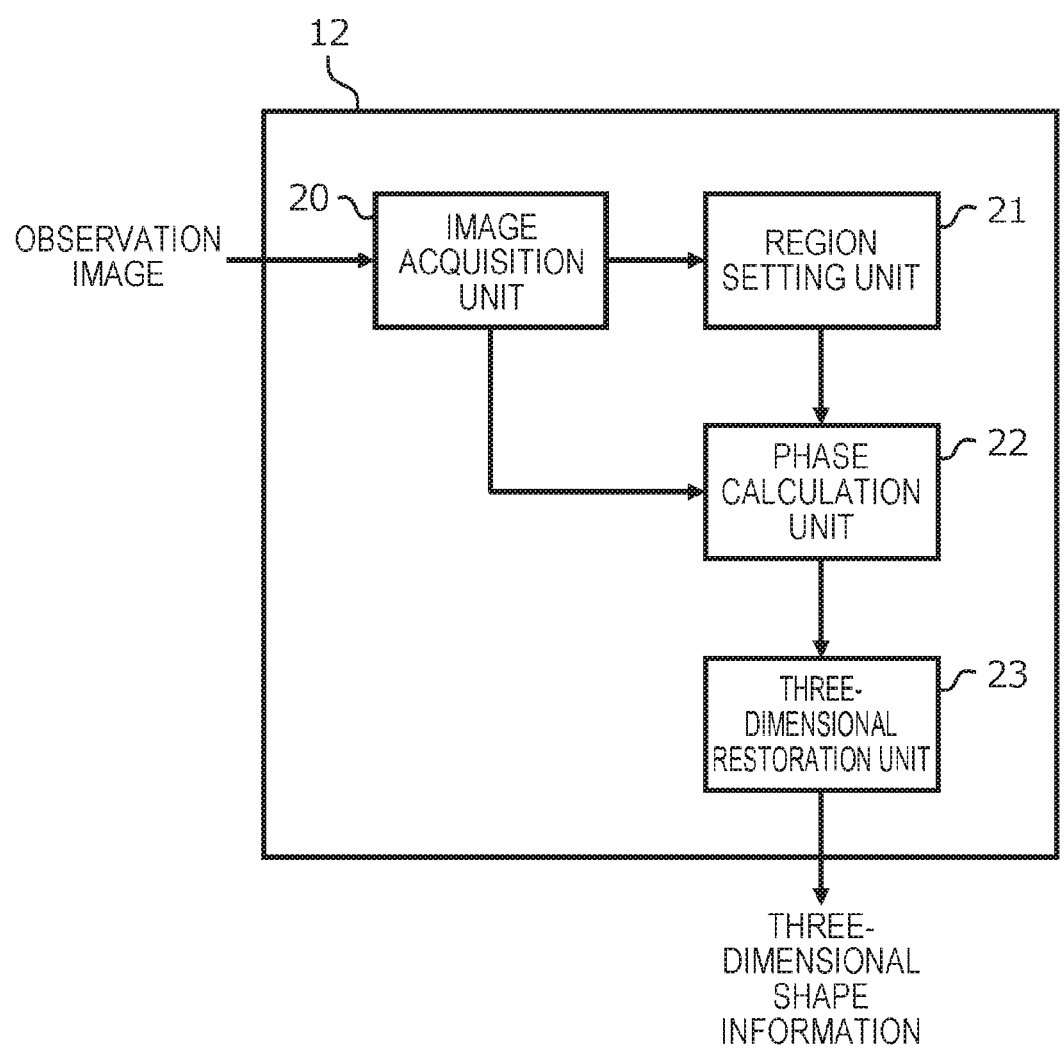
FIG. 2 is a block diagram depicting functions related to the three-dimensional shape measurement.

FIG. 2 is a block diagram depicting the functions of the control device 12 related to the three-dimensional shape measurement. For the functions related to the three-dimensional shape measurement, the control device 12 includes an image acquisition unit 20, a region setting unit 21, a phase calculation unit 22, and a three-dimensional restoration unit 23.

The image acquisition unit 20 has a function to acquire a plurality of observation images used for the three-dimensional shape measurement from the imaging device 11. The region setting unit 21 has a function to set a region on which the later mentioned multiple reflection correction is performed (hereafter called "correction region"), out of a visual field of the observation image. The phase calculation unit 22 has a function to calculate the phase value of a pattern in each pixel on the observation image (that is, each measurement point on the surface of the measurement object O) by analyzing the observation image. The three-dimensional restoration unit 23 has a function to calculate a three-dimensional position of each pixel (that is, each measurement point on the surface of the measurement object O) on the observation image based on the phase values calculated by the phase calculation unit 22. These functions will be described later.

(Model of Observation Light and Multiple Reflection Correction)

Figure 3:
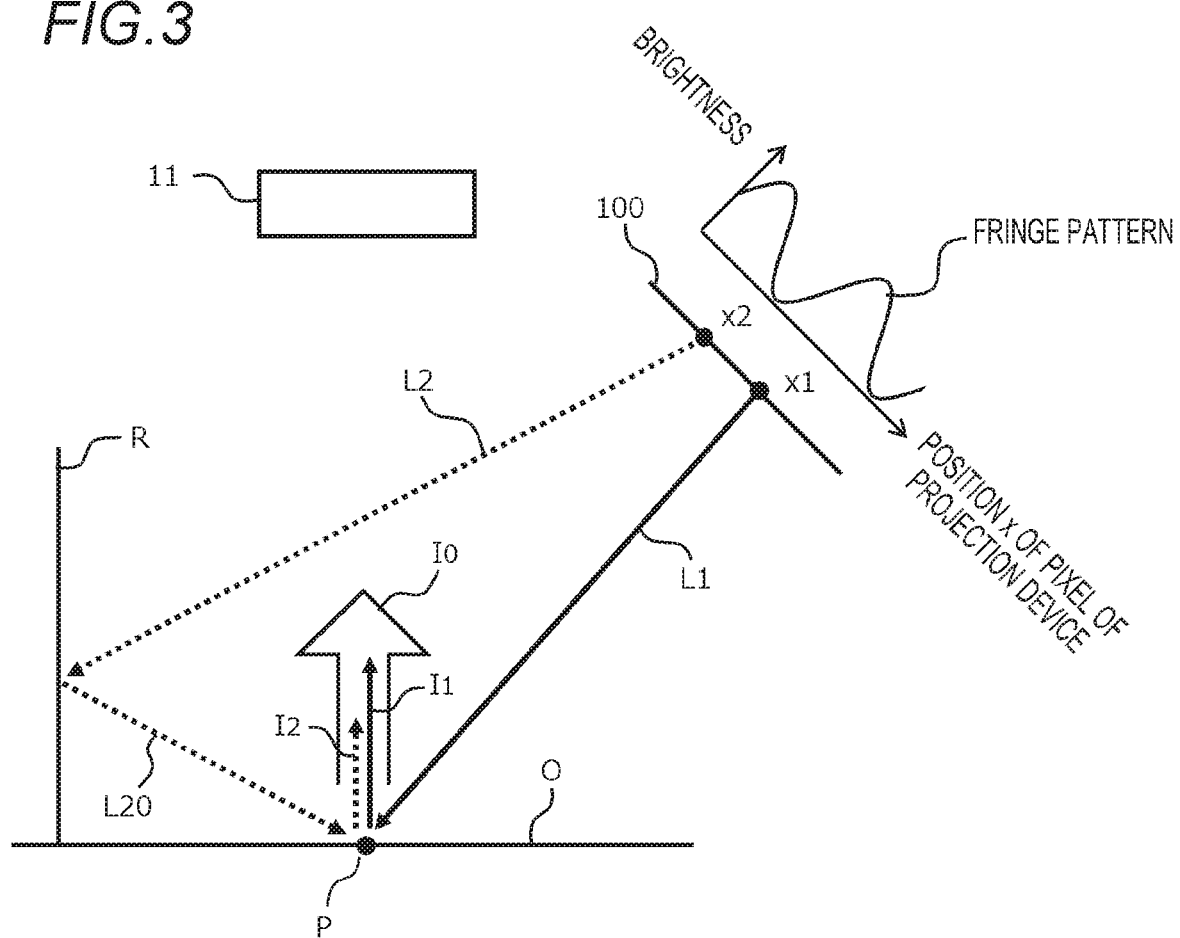
FIG. 3 is a schematic diagram depicting a model of multiple reflection and observation light.

FIG. 3 illustrates a model of multiple reflection and observation light.

A system in which a reflection surface R having high specularity (e.g. surface of a metal object) exists near a measurement object O will be considered. When a sinusoidal fringe pattern is projected from the projection device 10, it is assumed that light L1 (direct light) emitted from a point x1 on a panel 100 of the projection device 10, and reflection light L20 of light L2 which is emitted from a point x2 on the panel 100 of the projection device 10 and is reflected on a reflection surface R, reach a measurement point P on the measurement object O. In the following description, the point x on the panel 100 of the projection device 10 is regarded as a point light source, and is called a "projection light source x".

In this case, the observation light $I_O$ observed by the imaging device 11 can be assume to be composite light of: light (primary reflection light) $I_1$ which is light generated when the light L1 projected from the projection device 10 is reflected (diffusion reflection) at the measurement point P and enters the imaging device 11; and light (secondary reflection light) $I_2$ which is light generate when the light L20 projected from the projection device 10 and reflected (specular reflection) on the reflection surface R is reflected (diffusion reflection) at the measurement point P and enters the imaging device 11, and this composite light can be modeled as follows.

[Math. 2]
$$I_O = I_1 + I_2 \quad (1)$$

[Math. 3]
$$I_O = c \sin(\theta_M) \quad (2)$$

$$I_1 = a_1 R_1 \sin(w_f t + k_f x_1 + \phi) \quad (3)$$

$$I_2 = a_1 R_1 R_2 \sin(w_f t + k_f x_1 + \phi + k_f(x_2 - x_1)) \quad (4)$$

Here c is a brightness amplitude value of the observation light $1_O$, and $\theta_M$ is a phase value of the observation light $1_O$. $a_1$ is a maximum brightness of the fringe pattern, $R_1$ is a reflectance of the measurement point P, and $R_2$ is a reflectance of the reflection surface R. $w_f$ is an angular velocity of the fringe pattern, and t is time. $k_f$ is a wave number of the fringe pattern, $x_1$ is a position of the projection light source of the light L1, and $x_2$ is a position of the projection light source of the light L2. $\phi$ is an initial phase of the fringe pattern. Among these variables, $R_1$, $R_2$, $x_1$ and $x_2$ are unknown.

Here the brightness amplitude value "$a_1R_1$" of the primary reflection light $I_1$ is replaced with "a", the brightness amplitude value "$a_1R_1R_2$" of the secondary reflection light $I_2$ is replaced with "b", the phase value "$w_f t + k_f x_1 + \phi$" of the primary reflection light is replaced with "$\theta_{true}$", and the phase difference "$k_f(x_2 - x_1)$" between the primary reflection light $I_1$ and the secondary reflection light $I_2$ is replaced with "$\alpha$", Expression (1) to Expression (4) are rearranged, then Expression (1) can be expressed as follows.

[Math. 4]

$$c \sin(\theta_{true} + \Delta\theta) = a \sin(\theta_{true}) + b \sin(\theta_{true} + \alpha) \quad (5)$$

Here $\Delta\theta$ is a phase error caused by the secondary reflection light $I_2$, and the following expression is satisfied.

[Math. 5]

$$\theta_M = \theta_{true} + \Delta\theta \quad (6)$$

The following expression can be derived from Expression (5) and the composition theorem.

[Math. 6]

$$\Delta\theta = \arctan\left(\frac{b\sin(\alpha)}{a + b\cos(\alpha)}\right) \quad (7)$$

$$c = \sqrt{a^2 + b^2 + 2ab\cos(\alpha)} \quad (8)$$

There are three unknown quantities in Expression (8), a, b, and $\alpha$, hence Expression (8) can be solved if at least three samples, of which conditions of the brightness amplitude value c of the observation light $I_o$ are mutually different, are actually measured. Then the values a, b, and $\alpha$, determined from Expression (8), are inserted into Expression (7), then the phase error $\Delta\theta$ caused by the secondary reflection light $I_2$ can be derived, and the true value $\theta_{true}$ of the phase can be determined from the observed phase value $\theta_M$ and Expression (6). The operation of calculating the true value $\theta_{true}$ of the phase (phase value in the case of not being influenced by the secondary reflection light $I_2$) using the above mentioned model is called "multiple reflection correction".

(Three-Dimensional Shape Measurement)

Figure 4:
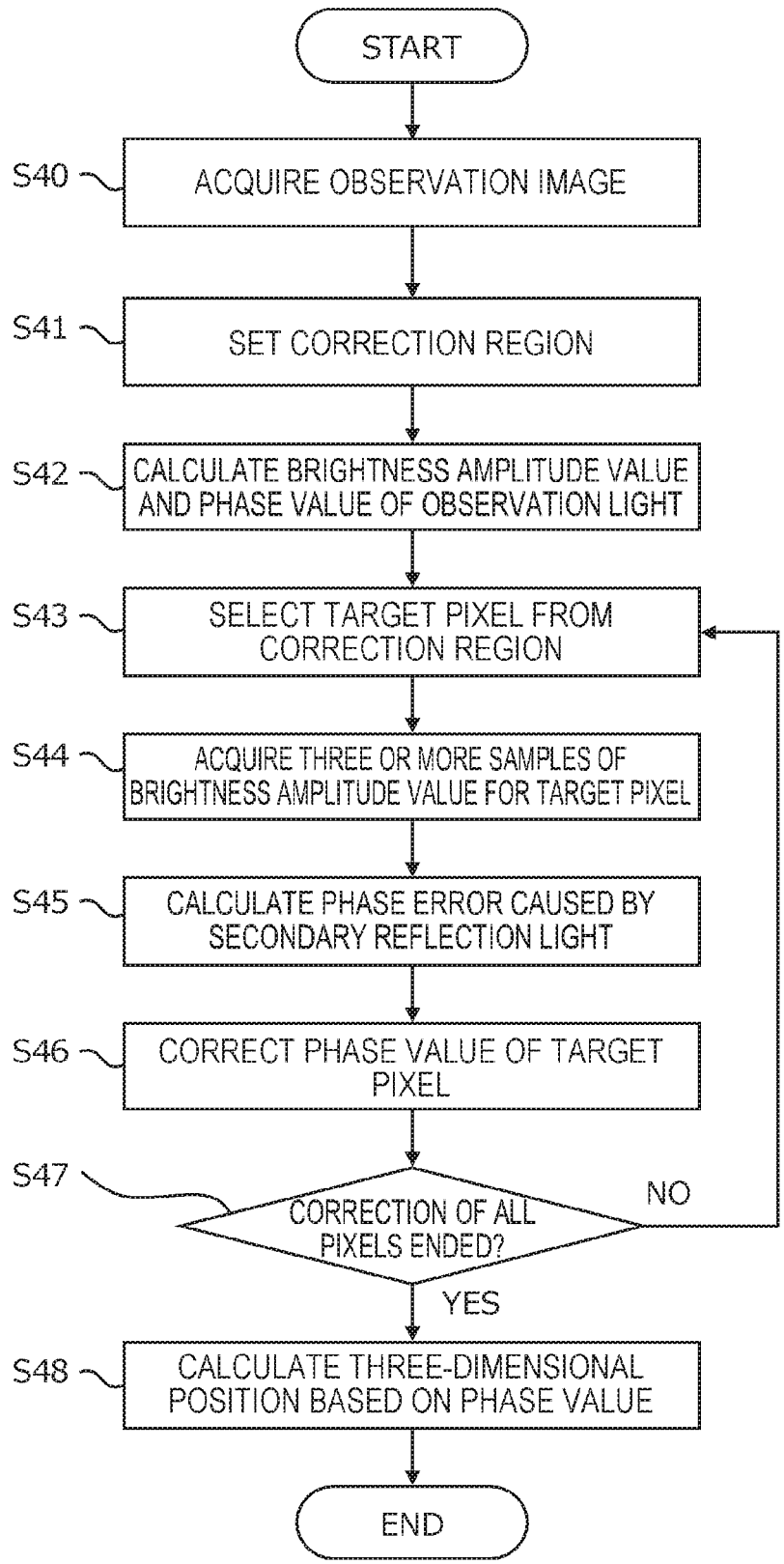
FIG. 4 is a flow chart depicting a flow of the three-dimensional shape measurement.

A processing flow of the three-dimensional shape measurement will be described with reference to the flow chart in FIG. 4.

In step S40, the control device 12 controls the projection device 10 and the imaging device 11, and captures a plurality of observation images. For example, the control device 12 projects a fringe pattern of which brightness changes sinusoidally (maximum brightness: $a_1$, wave number: $k_f$), four times while changing the phase by $\pi/4$ at a time, and captures four observation images. If the phase unwrapping is performed to expand the measurement range, capturing the observation image may be repeated with changing the wave number (frequency) of the fringe pattern. For example, in the case of a general phase unwrapping, a fringe pattern at high frequency for measurement and a fringe pattern at low frequency for unwrapping are captured, or in the case of MPS, a plurality of types of fringe patters at high frequency are captured. The data of the observation image is loaded into the control device 12 by the image acquiring unit 20, and is stored in the memory or the non-volatile storage device.

In step S41, the region setting unit 21 sets a correction region out of the visual field of the observation image. The correction image, however, may be set by any method. For example, an image acquired from the imaging device 11 may be displayed on the display device, and the user may specify the region using an input device. Or the region setting unit 21 may analyze the observation image, detect (estimate) a region where multiple reflection is generated, and automatically set the correction region. If the measurement object is an industrial product, such as a surface mount substrate, the region setting unit 21 may detect the existence of a reflection surface R, and a region where multiple reflection may be generated, based on the design data (CAD data) or the like, and automatically set the correction region.

In this embodiment, a region where the multiple reflection correction is performed is limited like this, whereby the processing load required for the multiple reflection correction can be reduced, and the processing time of the three-dimensional shape measurement can be decreased. If it is not necessary to decrease the processing time, the multiple reflection correction may be performed for the entire region of the observation image. In this case, the processing in step S41 can be omitted.

In step S42, the phase calculation unit 22 performs a fast Fourier transform (FFT) for a plurality of observation images which were captured with changing the phase, and calculates the brightness amplitude value c and the phase value $\theta_M$ of the observation light at each pixel on the observation image.

In step S43, the phase calculation unit 22 selects a pixel to be a processing target (hereafter called "target pixel $p_0$"), out of the correction region that was set in step S41. Then in step S44, the phase calculation unit 22 acquires three or more samples of the brightness amplitude value c of the measurement light for the target pixel $p_0$.

The three or more samples of the brightness amplitude value c of the measurement light can be selected so as to be mutually different in at least one of the conditions of "position of the pixel on the observation image" and "spatial frequency of the fringe pattern".

For example, when the brightness amplitude value of a pixel $p_j$ in an observation image observed using a fringe pattern having a wave number $k_{fi}$ is $c_{ij}$, the brightness amplitude values $c_{00}$, $c_{01}$, $c_{02}$ . . . observed in one type of fringe pattern having a wave number $k_{f0}$ may be selected as the three or more samples for each of the target pixel $p_0$ and the neighboring pixels $p_1$, $p_2$ . . . thereof. In the case of this method, only one type of wave number of the fringe pattern is required, hence a number of times of capturing the observation image can be lessened. Here it is preferable that the neighboring pixels $p_1$, $p_2$ . . . are selected from a local region near the target pixel $p_0$. This is because the pixels $p_0$, $p_1$, $p_2$ . . . in the local region (micro region that can be approximated as a plane) can be regarded as pixels under the same conditions, such as reflectance of the measurement object surface. Further, it is preferable that the pixels $p_0$, $p_1$, $p_2$ . . . are selected from positions in which a phase of the fringe pattern is mutually different. Furthermore, it is preferable that the pixels are pixels which line up in a direction parallel with an epi-polar line. This is because selecting samples like this make it possible to accurately calculate the phase error using a minimum number of samples.

The brightness amplitude values $c_{00}, c_{10}, c_{20} \ldots$ observed in three or more types of fringe patterns having the wave numbers $k_{f0}, k_{f1}, k_{f2} \ldots$ may be selected as the three or more samples for the target pixel $p_0$. In the case of this method, samples of the same pixel (same measurement, point) are used, hence phase error estimation becomes more accurate. This method is preferable especially when the shape (irregularity) of the surface of the measurement object and reflectance thereof are not uniform. Here the wave numbers $k_{f0}$, $k_{f1}, k_{f2} \ldots$ are selected so that one wave number does not becomes an integral multiple of another wave number. In the case of MPS, the brightness amplitude values of the target pixel $p_0$, which was observed using three or more types of fringe patterns at high frequency, can be directly used as the three or more samples.

The brightness amplitude values $c_{00}, c_{01}, c_{11} \ldots$ or the brightness amplitude values $c_{00}, c_{11}, c_{22} \ldots$, of which conditions are different in both the positions of the pixel and the wave number of the fringe pattern, may be used as the three or more samples. In other words, samples of which conditions are different in both the positions of the pixel and the spatial frequency of the fringe pattern may be used.

In step S45, the phase calculation unit 22 calculates the phase error $\Delta\theta$ caused by the secondary reflection light by solving Expression (7) and Expression (8) using the three or more samples of the brightness amplitude values acquired in step S44. Then in step S46, the phase calculation unit 22 calculates the corrected phase value $\theta_{true}$ of the target pixel $p_0$ by correcting the phase value $\theta_M$ using the phase error $\Delta\theta$. In this embodiment, the corrected phase value $\theta_{true}$ is regarded as a value determined by subtracting the phase error $\Delta\theta$ from the observation phase value $\theta_M$ ($\theta_{true}=\theta_M-\Delta\theta$).

The above processing in steps S43 to S46 are performed for all the pixels in the correction region (step S47).

Then in step S48, the three-dimensional restoration unit 23 calculates a three-dimensional position of each pixel on the observation image (that is, each measurement point on the measurement object), based on the phase value of each pixel (corrected phase value if the pixel is in the correction region) calculated by the phase calculation unit 22. Thereby the three-dimensional shape of the measurement object surface can be restored. For calculating the three-dimensional shape based on the phase value, the phase shift method, MPS or the like can be used. These algorithms are publicly known, hence detailed description is omitted here.

According to the above mentioned multiple reflection correction of this embodiment, the three-dimensional shape is calculated based on the phase value after correcting the phase error caused by the secondary reflection light, hence accurate three-dimensional shape measurement, in which the influence of multiple reflection is reduced, can be implemented. Further, the multiple reflection correction of this embodiment does not interrupt the measurement of the three-dimensional shape, unlike the conventional methods, and can be applied regardless whether the multiple reflection is actually generated in the portion or not, therefore this method can be easily implemented in an actual apparatus is easy.

(Example of Phase Error Calculation Method)

An example of a phase error calculation method by the phase calculation unit 22, that is, a specific method of solving Expression (7) and Expression (8), will be described next.

If Expression (8) is transformed, the following expression is acquired.

[Math. 7]
$$c^2 = a^2 + b^2 + 2ab\cos(k_f(x_2-x_1)) \quad (9)$$

Here a and b are constants (although are unknown), hence the brightness amplitude value c of the observation light is expressed as a function of $k_f$ and $x_2-x_1$.

Figure 5:
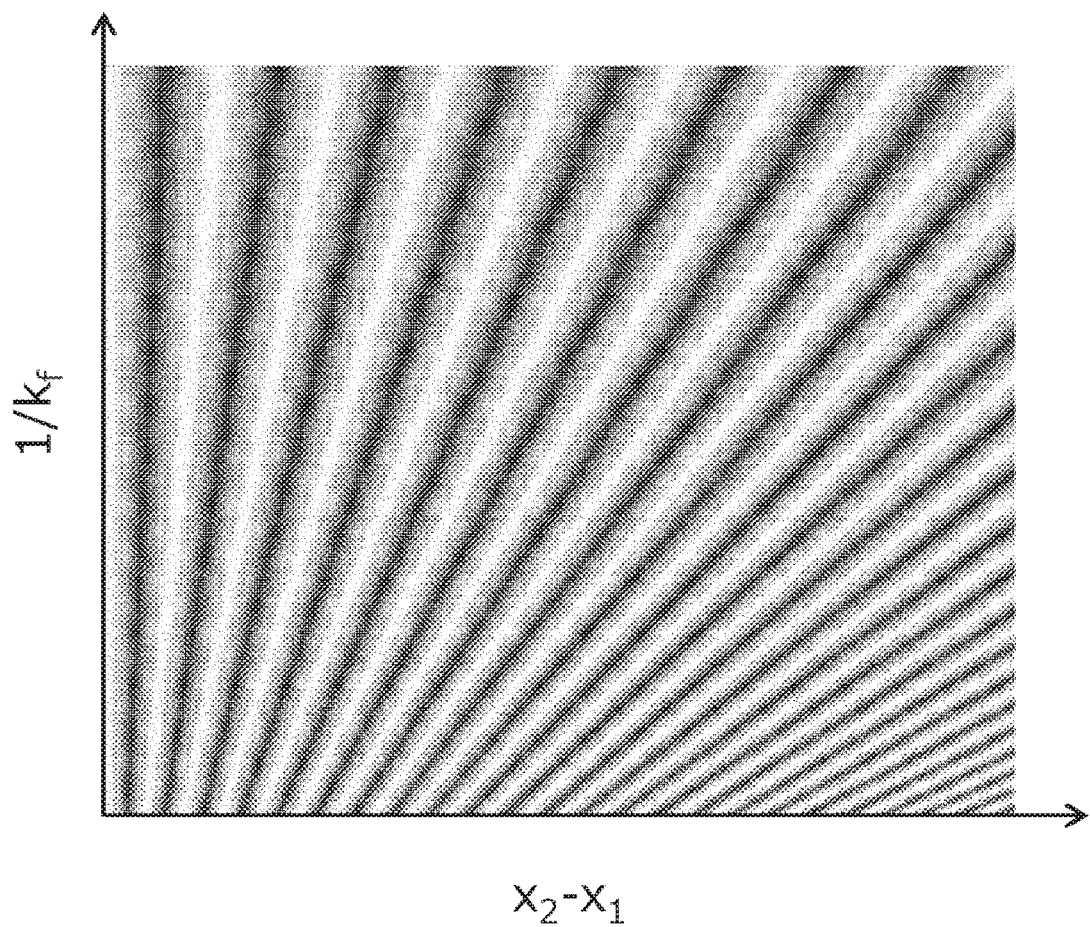
FIG. 5 is a conceptual diagram depicting a relationship of the first to third indices in the reference information.
Figure 6:
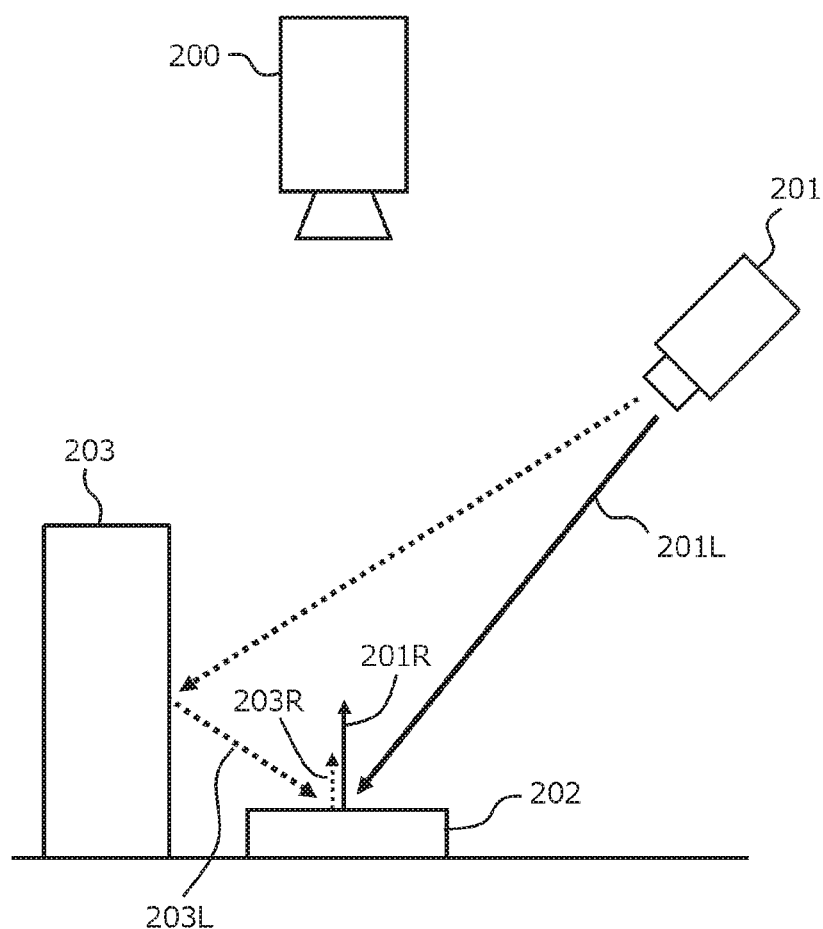
FIG. 6 is a diagram depicting the multiple reflection.

Therefore in this example, "$c^2$" is selected as the first index on the brightness amplitude value, "$1/k_f$" is selected as the second index on the spatial frequency of the fringe pattern to be projected, and "$x_2-x_1$" is selected as the third index on the phase difference between the primary reflection light and the secondary reflection light. Then the combination of the first to third index values that satisfies Expression (9) is calculated by setting appropriate constants for a and b, whereby reflectance information (three-dimensional table) that defines the relationship of the first to third indices is created and stored in the storage device of the control device 12 in advance. FIG. 5 is a conceptual diagram depicting the relationship of the first to third index values in the reference information. The abscissa indicates a value of the third index $x_2-x_1$, the ordinate indicates a value of the second index $1/k_f$, and the density indicates the value of the first index $c^2$.

For example, it is assumed that the brightness amplitude values $c_{00}, c_{10}, c_{20}$ and $c_{30}$, which are observed with the four types of fringe patterns having wave numbers $k_{f0}, k_{f1}, k_{f2}$ and $k_{f3}$, are acquired as samples for the target pixel $p_{0S}$. Then the phase calculation unit 22 retrieves the reference information by using a retrieval algorithm which does not depend on scale, such as normalized cross-correlation, so as to determine the third index value $x_2-x_1$, of which ratio of the first index values corresponding to the second index values $1/k_{f0}$, $1/k_{f1}, 1/k_{f2}, 1/k_{f3}$ are closest to $c_{00}^2:c_{10}^2:c_{20}^2:c_{30}^2$.

Then in order to determine the unknown quantities a and b, the phase calculation unit 22 defines the following determinant (10) by Expression (9).

[Math. 8]
$$\begin{bmatrix} c_{f0}^2 \\ c_{f1}^2 \\ c_{f2}^2 \\ c_{f3}^2 \end{bmatrix} = \begin{bmatrix} 1 & 1 & \cos(k_{f0}(x_2-x_1)) \\ 1 & 1 & \cos(k_{f1}(x_2-x_1)) \\ 1 & 1 & \cos(k_{f2}(x_2-x_1)) \\ 1 & 1 & \cos(k_{f3}(x_2-x_1)) \end{bmatrix} \begin{bmatrix} a^2 \\ b^2 \\ 2ab \end{bmatrix} \quad (10)$$

The phase calculation unit 22 determines the values of $a^2$, $b^2$ and $2ab$ by solving the determinant (10) by a least-squares method, and then determines a combination of a and b that satisfies these values.

Then the phase calculation unit 22 calculates the phase difference $\alpha=k_f(x_2-x_1)$ using the value of $x_2-x_1$ acquired by the above calculation and the value of the wave number $k_f$ (e.g. $k_{f0}$) used for the three dimensional shape measurement, and inserts this value $\alpha$ and the values of a and b determined by the determinant (10) into Expression (7), where by the phase error $\Delta\theta$ is calculated.

According to the above calculation method, the values of the phase difference $\alpha$ and the phase error $\Delta\theta$ can be calculated simply and accurately from a plurality of samples of the brightness amplitude value c.

The above description of the embodiment merely exemplifies the present invention. The present invention is not limited to this embodiment, but may be modified in various way within the scope of the technical idea thereof. For example, in the above calculation example, the retrieval processing and the matrix calculation are performed using four examples, but may be performed using three or five or more samples. Further, the Expression (7) may be directly solved by non-linear optimization, without using reference information.

REFERENCE SIGNS LIST

O Measurement object
P Measurement point
R Reflection surface
1 Three-dimensional shape measurement device
10 Projection device
11 Imaging device
12 Control device
20 Image acquisition unit
21 Region setting unit
22 Phase calculation unit
23 Three-dimensional restoration unit
100 Panel

The invention claimed is:

1. A three-dimensional shape measurement device, comprising:
a projector, which is configured to project a pattern having cyclicity in a time direction and a space direction to a measurement object;
a camera, which is configured to capture an image of the measurement object; and
computer, which is configured to measures a three-dimensional shape of the measurement object using a plurality of observation images captured by the camera while changing a phase of a pattern projected from the projector,
wherein the computer is configured to:
assume that observation light observed by the camera is composite light of primary reflection light and secondary reflection light, the primary reflection light being light which is projected from the projector, is reflected at a measurement point on the measurement object and enters the camera, the secondary reflection light being light which is projected from the projector, is reflected on another reflection surface, is reflected at the measurement point on the measurement object and enters the camera,
perform a fast Fourier transform for the plurality of observation images to calculate a brightness amplitude value and a phase value of the observation light at each pixel on the observation image,
acquire three or more samples of the brightness amplitude value of the observation light from the calculated brightness amplitude values by the fast Fourier transform,
calculate a phase error caused by the secondary reflection light by solving the following expression using the three or more samples, $$\Delta\theta = \arctan\left(\frac{b\sin(\alpha)}{a + b\cos(\alpha)}\right)$$
$$c = \sqrt{a^2 + b^2 + 2ab\cos(\alpha)}$$

wherein
$\Delta\theta$: phase error caused by secondary reflection light,
a: brightness amplitude value of primary reflection light,
b: brightness amplitude value of secondary reflection light,
c: brightness amplitude value of observation light, and $\alpha$: phase difference between primary reflection light and secondary reflection light;
calculate a corrected phase value by correcting the phase value of the observation light using the phase error, and
calculate a three-dimensional position of the measurement point on the measurement object based on the corrected phase value.

2. The three-dimensional shape measurement device according to claim 1,
wherein the three or more samples are samples, wherein conditions of the samples are different in at least one of: a position of the pixel on the observation image; and a spatial frequency of the pattern.

3. The three-dimensional shape measurement device according to claim 1,
wherein the three or more samples are brightness amplitude values that are observed for three or more pixels on the observation image using one type of frequency pattern,
wherein the three or more pixels are pixels such that phases of the pattern at positions of the pixels are different from each other.

4. The three-dimensional shape measurement device according to claim 3, wherein the three or more pixels are selected from a local region on the observation image.

5. The three-dimensional shape measurement device according to claim 3, wherein the three or more pixels are pixels which line up in a direction parallel with an epi-polar line on the observation image.

6. The three-dimensional shape measurement device according to claim 1, wherein the three or more samples are brightness amplitude values observed for one pixel on the observation image using three or more types of frequency patterns.

7. The three-dimensional shape measurement device according to claim 1,
wherein the computer is configured to:
store reference information that defines a relationship of a first index on the brightness amplitude value, a second index on a spatial frequency of the pattern to be projected, and a third index on the phase difference between the primary reflection light and the secondary reflection light, and
determine the phase difference between the primary reflection light and the secondary reflection light based on the three or more samples, the spatial frequency of the pattern projected when each sample was observed, and the reference information.

8. The three-dimensional shape measurement device according to claim 1, wherein the computer is configured to calculate the three-dimensional position of the measurement point on the measurement object by the phase shift method or micro phase shifting (MPS) based on the corrected phase value.

9. The three-dimensional shape measurement device according to claim 1, wherein the another reflection surface is a specular reflection surface.

10. A three-dimensional shape measurement method for measuring a three-dimensional shape of a measurement object using a plurality of observation images captured by a camera while changing a phase of a pattern projected from a projector,
wherein the pattern has cyclicity in a time direction and a space direction,
wherein it is assumed that observation light observed by the camera is composite light of primary reflection light and secondary reflection light, the primary reflection light being light which is projected from the projector, is reflected at a measurement point on the measurement object and enters the camera, the secondary reflection light being light which is projected from the projector, is reflected on another reflection surface, is reflected at the measurement point on the measurement object and enters the camera, the three-dimensional shape measurement method comprising:

performing a fast Fourier transform for the plurality of observation images to calculate a brightness amplitude value and a phase value of the observation light at each pixel on the observation image;

acquiring three or more samples of the brightness amplitude value of the observation light from the calculated brightness amplitude values by the fast Fourier transform;

calculating a phase error caused by the secondary reflection light by solving the following expression using the three or more samples;

$$\Delta\theta = \arctan\left(\frac{b\sin(\alpha)}{a + b\cos(\alpha)}\right)$$

$$c = \sqrt{a^2 + b^2 + 2ab\cos(\alpha)}$$

wherein $\Delta\theta$: phase error caused by secondary reflection light, a: brightness amplitude value of primary reflection light, b: brightness amplitude value of secondary reflection light, c: brightness amplitude value of observation light, and $\alpha$: phase difference between primary reflection light and secondary reflection light, calculating a corrected phase value by correcting the phase value of the observation light using the phase error; and calculating a three-dimensional position of the measurement point on the measurement object based on the corrected phase value.

11. A non-transitory computer readable medium storing a program that causes a computer to execute each step of the three-dimensional shape measurement method according to claim 10.

\* \* \* \* \*